June 13, 1939.    O. W. BECKER    2,161,908
METHOD OF AND APPARATUS FOR MAKING ARTIFICIAL SAUSAGE CASINGS
Filed Aug. 3, 1931    2 Sheets-Sheet 1
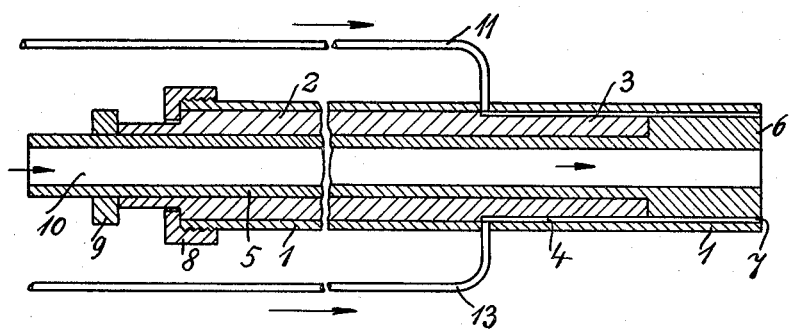
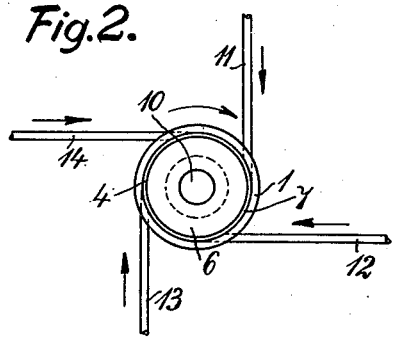
Inventor
O. W. Becker
By
Attorney

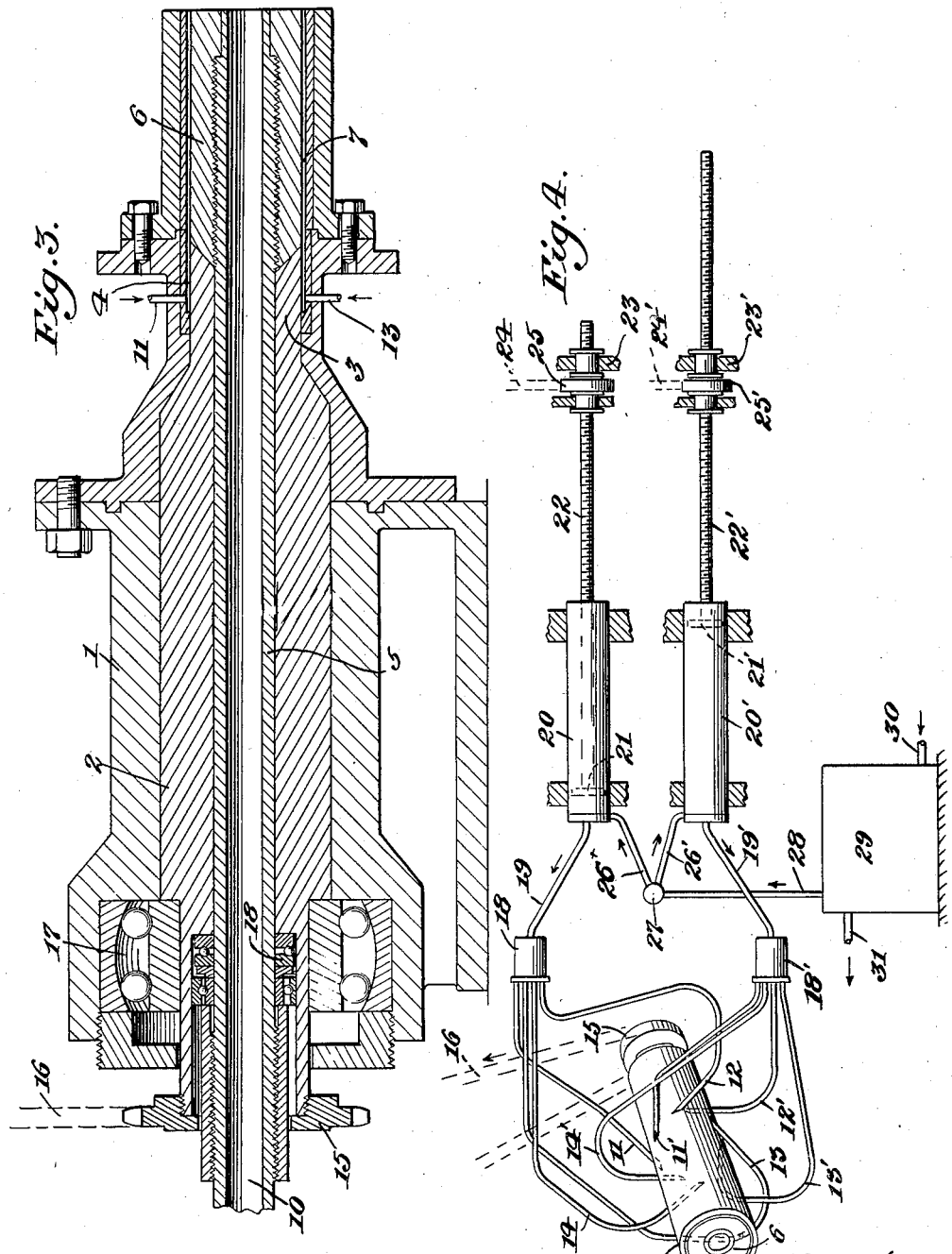

Patented June 13, 1939

2,161,908

UNITED STATES PATENT OFFICE 2,161,908

METHOD OF AND APPARATUS FOR MAKING ARTIFICIAL SAUSAGE CASINGS

Oskar Walter Becker, Hamburg, Germany, assignor, by mesne assignments, to Naturin Gesellschaft mit beschränkter Haftung, Weinheim, Germany Application August 3, 1931, Serial No. 554,919
In Germany August 7, 1930

12 Claims. (Cl. 18—14)

This invention relates to a method of and apparatus for making sausage casings.

Many methods of making artificial sausage casings are known. The material used in such known methods is either of animal or vegetable nature.

It has for example been proposed to impregnate a fabric of material or silk in suitable manner. The disadvantage of this method consists in this that the appearance of a wholly indigestible fabric is retained and the finished sausage is dull and has no life.

Moreover, animal or vegetable materials have been applied to a fabric which after the drying operation is completed is again withdrawn from the interior of the casing. Sausage casings thus produced have a natural lustre but they retain particularly for the expert, always the disturbing mark of the fabric and therefore the nature of an artificial product is recognised.

A further known method consists in pressing a thin mixture formed from animal fibres by centrifugal force against the inner walls of rotating tubes and supplying heat to such tubes so that the drying mass due to its shrinkage separates from the tube walls itself in a tubular form. The irregular deposit of the fibres due even to slightly eccentric running of the rotating tubes and consequent irregular drying and separation and tearing of the drying gut are among the disadvantages of this method.

It has also been proposed to spray a fluid mass which consists of softened sinews through an annular nozzle. The disadvantage of this method lies in the difficulty of converting the sinews into completely homogeneous liquid or thinly fluid mass, so that they can be sprayed so uniformly from fine annular nozzles that the nozzles will not become choked and that the sausage casing will have a smooth surface free from any lumps. In addition in this method the desired deposit in layers of the fibres recognised as preferable is not obtainable. A further disadvantage of this method lies in the large quantity of water which is necessary to bring the starting material into a thin soup-like or fluid condition. In order to evaporate this water again comparatively large and expensive drying installations are necessary. Moreover, a disadvantage of all known methods is that they are not continuous. The different steps of the process of production and the subsequent drying are repeated periodically. Consequently not only are large installations and many operations required but due to the periodical charging and discharge of the drying chambers great heat losses occur.

The method mentioned of producing casings by spraying a fluid mass formed from softened sinews through an annular nozzle can be carried out continuously but the casings obtained due to want of recognition of the importance of definite layering of the particles of the mass or fibres are practically incapable of use. By this spraying method a tubular casing is certainly obtained but the fibres of the product are only laid lengthwise so that the casing is insufficiently strong in the direction of its circumference. The recognition of this circumstance is the main foundation for the present invention.

In another group of known methods for producing sausage skins, cellulose has been employed as the starting material. These methods can be carried out continuously but the finished product is not suitable for requirements which must be based on an artificial gut if it is to appear as a complete substitute for a natural gut. Between cellulose and the animal materials of which natural gut consists there are great and essential differences as regards chemical composition. Cellulose is, on the one hand, quite indigestible by man and on the other hand it is not sufficiently elastic to provide the properties of the animal skin. In order to obtain elastic expansion and contraction of the cellulose it must be treated with hygroscopic media. As a result the artificial gut produced from cellulose on account of too great sensitiveness to water must not be wetted like natural gut before use. The finished sausages have moreover an unnatural noticeable high lustre.

If, however, the treatment by hygroscopic medium be dispensed with, then the finished sausage casing does not possess the property of elastic contraction. It acts more like paper and forms ugly creases. Moreover, its porosity leaves something to be desired so that it is not suitable for preserved sausage, as this cannot then breathe.

In accordance with the invention all these disadvantages of known method are avoided. In contradistinction to known methods there is not used a fluid or soup-like material of animal or vegetable origin, but a mass, the condition of which may be described as plastic or kneadable and is dough-like. The invention consists in this that the animal or vegetable material is first worked up to form this plastic kneadable mass and it is then pressed through annular nozzles or the like through the medium of an under pressure in continuous operation. For example, the skin or flesh parts after they have been washed can be subjected to suitable chemical dissolving processes, which cause the parts to swell. In this condition the skin or flesh parts (or the vegetable starting materials) are disintegrated or reduced to fibres. From the swollen or disintegrated material or material reduced to fibres there is produced by kneading without addition of water a plastic mass of high consistency and tackiness. It is important that in pressing this plastic kneadable material through the annular nozzles that the particles of the mass should be laid in different directions, preferably crosswise over one another and locked together.

In the accompanying drawings apparatus for performing this method is shown partly diagrammatic:

Fig. 1 showing the apparatus in longitudinal section and

Fig. 2 a front elevation.

Fig. 3 is a longitudinal section through the nozzle and the parts connected therewith, Fig. 4 is a diagrammatic view showing all the parts with the nozzle shown at the left thereof.

Referring to the drawings, in a cylindrical housing 1 is mounted a core member 2 which may rotate about its longitudinal axis. The forward part 3 of this core member is reduced in diameter with respect to its remaining parts so as to form an annular space 4 between this front part and the housing 1. Within the rotating core member 2, 3 is located a stationary core 5, the forward part 6 of which projects beyond the forward part 3 of the core 2. The forwardly projecting part 6 of the core 5 is of such external diameter as to form between it and the housing 1 an annular space 7 which forms a continuation of the annular space 4. 8 denotes a collar nut and 9 an adjusting ring. The inner stationary core 5, 6 has a longitudinal bore 10 through which air under pressure can be blown in the direction of the arrow.

The material is introduced into the annular space 4, i. e., into the hollow chamber located on the rotating part of the outer core by way of tubes 11, 12, 13, 14 which as shown in Fig. 2 are disposed preferably tangentially of the annular space 4. The material passing out through these tubes in the direction of the arrow is therefore fed in the direction of rotation of the annular space 4 and by this rotation is entrained immediately and distributed in the annular space 4.

It has been found by experiment that the plastic mass cannot be forced through annular nozzles under high pressure. In this case due to the high consistency of the plastic mass a quite superficial layering of the particles of the mass or fibres takes place, so that the resulting tube falls apart again even with the slightest internal excess pressure. The construction of the apparatus for producing artificial sausage casings described has therefore been found preferable and necessary. It is on the one hand important that the plastic mass should be pressed through the thin tubes 11 to 14—the internal diameter of which may be for example 2 mms. or smaller—tangentially into the rear part of the annular nozzle, i. e., into the space 4. The mass is led to the tubes through a pressure cylinder or preferably through a number of pressure cylinders. On the other hand it is important that a part of the annular nozzle, namely the forward part 3 of the outer core 2 should rotate in the direction of the streams of material passing out from the tubes while the forward part of the annular nozzle, the annular space 7 and the forward part 6 of the inner core bounding it on one side should be stationary. The following result is thus obtained.

During the passage of the plastic mass through the thin tubes the particles of the mass or fibres are all laid in the axial direction. By introducing them tangentially into the annular nozzle space 4 they are laid tangentially with respect to the longitudinal direction of the resulting gut. There is thus produced a tubular casing which even in the undried condition has an astonishing strength in the peripheral direction. This is the more necessary as every cylindrical body has to sustain with an internal excess pressure in the direction of the periphery double the force which it does in the axial direction.

The supply of the plastic mass through the thin tubes prevents any formation of eddies within the mass. Any eddies produced would form irregularities in the thickness of the wall of the casing and in the departure from the straight cylindrical form would produce irregular layering of the mass of particles or fibres and the strength of the gut would be greatly reduced. The supply of the mass to the annular nozzles through a plurality of tubes permits further the use of two or more pressure cylinders one at least of which can be always in operation so that continuous operation is ensured.

The rotating core portion 3 effects the maintenance of the tangential layering of the fibres or particles of the mass. Further a complete pressure balance takes place within the annular nozzle so that the tubular casing comes straight out from the nozzle. Further by making the core rotate and by keeping the outer wall of the casing stationary the particles of the mass are thoroughly kneaded together or rolled.

If now in the forward movement through the annular nozzle the mass already formed of tube shape and connected together passes into the forward annular nozzle chamber 7, in which not only the outer wall but also the core portion is stationary, the disturbance of the particles of the mass or fibres on the surface of the tubular casing is effected in such manner that the fibres on this surface are directed from the tangential direction into the axial direction. Moreover, a rotary forward movement of the projecting gut is prevented by this stationary annular nozzle chamber. In consequence of this disturbance of the fibres on the surface of the tubular casing superpositioning which may be described as transverse locking of the fibres takes place. The strength of the casing in the axial direction is thereby considerably increased so that the casing opposes in all directions very great resistance to tearing. Thus since a maximum strength can be obtained from the material a gut of extraordinarily fine wall can be produced. The casings thus produced are themselves in their undried condition in a position to resist a not inconsiderable internal air pressure. They can therefore at once be subjected to continuous drying. As the amount of water contained in the plastic mass as already explained is very small the drying operation of the finished casings takes very little time.

In Figs. 3 and 4, parts corresponding to the showing in Figs. 1 and 2 have the same reference characters. In Fig. 3 the cylindrical housing is shown at 1 and 2 indicates the core member which may rotate about its longitudinal axis. The forward part of the core member is shown at 3 and an annular space 4 between the forward part 3 and the housing 1. The stationary core is shown at 5 with the forward part 6 of this core forming a separate piece screwed onto the member 5. An annular space 7 is provided between the forward part 7 and the housing 1 and a longitudinal bore 10 extends through the stationary core member 5. Of the small tubes destined to contact the plastic mass into the annular space 4 only two, namely the tubes 11 and 13 are shown.

At the end of the rotatable core member 2 a sprocket wheel 15 is fixed which is driven by a chain 16 indicated in dash and dotted lines. Ball bearings 17 and 18 are provided to eliminate friction. In Fig. 4 the usual cylindrical housing 1 and the end of the stationary core member 6 is shown. For driving the core member a sprocket wheel 15 and a chain 16 is shown. Tangentially arranged with respect to the cylindrical housing 1 of the nozzle 8 tubes are shown instead of the four tubes shown in Fig. 2. These tubes may be grouped into two groups, one of which contains the tube designated by the reference members 11, 12, 13 and 14 and the other group comprises the four other tubes bearing the reference numerals 11', 12', 13' and 14'.

The tubes of the first group are connected to a distributing device 18 while the four tubes of the second group are connected to a distributing device 18'. These devices are connected respectively by pipes 19 and 19' to press cylinders 20 and 20'. Pistons 21 and 21' are arranged movable respectively in the press cylinders. The movement of the pistons may be effected by means of screw spindles 22, 22', which are mounted in bearings 23, 23' and which may be rotated by means of chains 24 and 24' which extend over sprocket wheels 25 and 25'.

The press cylinders 20 and 20' are respectively connected by means of pipes 26, 26' to a distributing device 27 which is connected by means of a pipe 28 to an apparatus 29 which is filled with the plastic mass. The plastic mass may be driven out from the apparatus 29 by means of a desired medium, for instance, by means of oil under pressure which may be introduced into the apparatus 29 by the pipe 30 leaving the apparatus through a pipe 31.

The plastic mass which has been filled into the apparatus 29 is pressed out from this apparatus and is conducted through pipe 28 from the distributing device 27 either by pipe 26 or by pipe 26' into one of the cylinders 20 or 20'. The screw spindles 22, 22' are rotated in opposite directions by means of the driving chains 24 and 24'. When for example the upper spindle 22 is moved to the left in the drawing the plastic mass contained in cylinder 20 is pressed out through pipe 19 into device 18 and through the first group of the small tubes 11, 12, 13 and 14 into the annular space 4 which it leaves in the form of a hollow continuous cylinder casing.

At the same time the piston 21' is moved to the right because its spindle 22' is rotated in that sense so that the cylinder 20' is filled by the plastic mass entering said cylinder through pipe 26'.

After the two pistons have reached the respective ends of the cylinders the sense of rotation of the spindles 22, 22' is reversed so that now cylinder 20 will be filled with plastic mass from apparatus 29, whereas the plastic mass contained in the cylinder 20' is pressed out through pipe 19' and device 18' and through the pipes of the second group 11', 12', 13' and 14' into the annular space 4.

Having now particularly described and ascertained the nature of my said invention and in what manner the same is to be performed, I declare that what I claim is:

1. Apparatus for making sausage casings of animal or vegetable material from a plastic kneadable mass by expressing it through annular nozzles, comprising in combination a tubular housing, a cylindrical core rotatable within said housing, said core formed with a forward part spaced from the said housing and forming an annular chamber therewith, a stationary inner core arranged within said first mentioned core, said stationary core projecting beyond the said first mentioned core and forming between it and the housing an annular chamber forming a continuation of the first mentioned annular chamber and supply tubes for the kneadable mass extending into said first mentioned annular chamber on the rotating part of the outer core for the purpose of introducing the plastic mass into said annular chamber.

2. Apparatus for making sausage casings of animal or vegetable material from a plastic kneadable mass by expressing it through annular nozzles, comprising in combination a tubular housing, a cylindrical core rotatable within said housing, said core formed with a forward part spaced from the said housing and forming an annular chamber therewith, a stationary inner core arranged within said first mentioned core, said stationary core projecting beyond the said first mentioned core and forming between it and the housing an annular chamber forming a continuation of the first mentioned annular chamber and supply tubes for the kneadable mass extending tangentially into said first mentioned annular chamber on the rotating part of the outer core for the purpose of introducing the plastic mass into said annular chamber.

3. A method of making artificial sausage casings comprising forming animal or vegetable fibrous material into a plastic kneadable mass, then subjecting portions of said mass to a circular motion to dispose a portion of the fibers substantially transverse to the longitudinal axes of the casings being formed and then subjecting said material to a lineal motion in order to interlock the fibers of the material.

4. An apparatus for making sausage casings of animal or vegetable material from a plastic kneadable mass comprising a tubular housing, a cylindrical core rotatable within said tubular housing, one end of said core being smaller than the inner diameter of said housing in order to form an annular space, means for leading plastic material into said annular space, a stationary inner core disposed within said cylindrical core, one end of said inner core projecting beyond said cylindrical core, said end of said inner core having a smaller diameter than the inner diameter of said housing to form an annular chamber which constitutes a continuation of said annular space.

5. An apparatus for making sausage casings of animal or vegetable material from a plastic kneadable mass comprising a housing, a cylindrical core rotatable within said housing, one end of said core being smaller than the inner diameter of said housing in order to form an annular space and conduits disposed tangentially upon said housing for leading material into said annular space.

6. A method of making artificial sausage casings of pasty animal or vegetable fibrous masses comprising working said animal or vegetable masses into a plastic kneadable mass and then forming casings from said mass while first disposing the major portion of the fibers transversely of the longitudinal axes of the casings and thereafter rearranging a portion of the fibers at the exterior and interior of said casings to be substantially parallel to the longitudinal axes of said casings.

7. An apparatus for making sausage casings of animal or vegetable material from a plastic kneadable mass comprising a housing, a substantially smooth core member supported by and within said housing and rotatable therein, one end of said core being cut away so as to form with said housing an annular space and means for leading plastic material into said annular space.

8. A method of making artificial sausage casings of pasty animal or vegetable fibrous masses comprising working said animal or vegetable masses into a plastic kneadable mass, then forming casings from said mass while first disposing the major portion of the fibers transversely of the longitudinal axes of the casings and thereafter rearranging a portion of the fibers of said casings so as to be substantial parallel to the longitudinal axes of said casings.

9. A method of making artificial sausage casings of pasty animal or vegetable fibrous masses comprising working said animal or vegetable masses into a plastic kneadable mass and then forming casings from said mass by a tangential projection of said mass to the longitudinal axes of said casings so as to dispose a substantial portion of said fibers transversely to the longitudinal axes of said casings.

10. A method of making artificial sausage casings of pasty animal or vegetable fibrous masses comprising working said animal or vegetable masses into a plastic kneadable mass and then forming casings from said mass by a tangential projection of said mass to the longitudinal axes of said casings so as to dispose a substantial portion of said fibers transversely to the longitudinal axes of said casings and then treating a surface of said casings so as to rearrange the fibers thereon substantially parallel to the longitudinal axes of the casings.

11. An apparatus for making sausage casings of animal or vegetable material from a plastic kneadable mass comprising a housing, a cylindrical core rotating in said housing one end of said core being smaller than the inner diameter of said housing in order to form an annular space and means for leading plastic material tangentially into said annular space whereby the majority of the fibers of said mass are at first disposed transversely of the longitudinal axes of the casings.

12. A method of making artificial sausage casings of pasty animal or vegetable fibrous masses comprising working said animal or vegetable masses into a plastic kneadable mass then forming casings from said mass by at first disposing the major portion of the fibers of said mass transversely to the longitudinal axes of said casings and thereafter rearranging a portion of said fibers so as to extend substantially longitudinally of the axes of said casings whereby an exceptionally sturdy sausage casing is obtained.

OSKAR WALTER BECKER.